United States Patent
Smith et al.

(10) Patent No.: US 10,158,620 B2
(45) Date of Patent: Dec. 18, 2018

(54) DNSSEC SIGNING SERVER

(71) Applicant: VERISIGN, INC., Reston, VA (US)

(72) Inventors: David Smith, Great Falls, VA (US);
James Gould, Leesburg, VA (US);
Ramana Lavu, Ashburn, VA (US);
Deepak Deshpande, Herndon, VA (US)

(73) Assignee: VERISIGN, INC., Reston, VA (US)

( * ) Notice: Subject to any disclaimer, the term of this patent is extended or adjusted under 35 U.S.C. 154(b) by 0 days.

(21) Appl. No.: 15/660,237

(22) Filed: Jul. 26, 2017

(65) Prior Publication Data

US 2017/0324724 A1 Nov. 9, 2017

Related U.S. Application Data

(60) Division of application No. 14/841,080, filed on Aug. 31, 2015, now Pat. No. 9,749,307, which is a continuation of application No. 13/098,940, filed on May 2, 2011, now Pat. No. 9,130,917.

(51) Int. Cl.
*H04L 29/06* (2006.01)
*H04L 29/12* (2006.01)
*H04L 9/32* (2006.01)

(52) U.S. Cl.
CPC ............ *H04L 63/08* (2013.01); *H04L 9/321* (2013.01); *H04L 9/3247* (2013.01); *H04L 61/1511* (2013.01); *H04L 63/123* (2013.01); *H04L 63/0853* (2013.01)

(58) Field of Classification Search
CPC ..................................................... H04L 63/08
See application file for complete search history.

(56) References Cited

U.S. PATENT DOCUMENTS

| | | | |
|---|---|---|---|
| 6,845,400 B2 * | 1/2005 | Macpherson | H04L 29/12009 709/227 |
| 7,941,517 B2 * | 5/2011 | Migault | H04L 29/12066 709/223 |
| 8,347,100 B1 * | 1/2013 | Thornewell | H04L 9/3247 713/176 |

(Continued)

OTHER PUBLICATIONS

Kondamuru et al. US Patent Application Publication No. 2012/0117621's Provisional U.S. Appl. No. 61/410,460, filed Nov. 5, 2010 Specification.*

(Continued)

*Primary Examiner* — Bradley Holder
(74) *Attorney, Agent, or Firm* — MH2 Technology Law Group, LLP

(57) ABSTRACT

Systems and methods for performing DNSSEC signing are described in which digital signature operations may be performed by a network accessible signing server that is configured to interact with a separate client application. Exemplary methods may include receiving a signing request at the signing server from the client application to sign first data. The signing server may determine an active KSK and/or an active ZSK for the first data. The first data may then be transmitted by the signing server to a digital signature modules, which may include, for example, a hardware support module, or software signing applications. The signing server may receive a digitally signed version of the first data from the digital signature module, and provide the signed first data to the client application.

15 Claims, 8 Drawing Sheets

(56) References Cited

U.S. PATENT DOCUMENTS

| | | | | |
|---|---|---|---|---|
| 2001/0027484 | A1* | 10/2001 | Nishi | H04L 12/46 709/223 |
| 2008/0260160 | A1* | 10/2008 | Moreau | H04L 29/12066 380/277 |
| 2009/0132813 | A1* | 5/2009 | Schibuk | G06Q 20/223 713/158 |
| 2009/0187649 | A1* | 7/2009 | Migault | H04L 29/12066 709/223 |
| 2010/0049982 | A1* | 2/2010 | Migault | H04L 29/12066 713/176 |
| 2012/0017090 | A1* | 1/2012 | Gould | H04L 9/006 713/176 |
| 2012/0054497 | A1* | 3/2012 | Korhonen | H04L 29/12066 713/179 |
| 2012/0096166 | A1* | 4/2012 | Devarapalli | H04L 61/1511 709/226 |
| 2012/0110144 | A1* | 5/2012 | Rossi | H04L 29/12066 709/220 |
| 2012/0110326 | A1* | 5/2012 | Rossi | H04L 29/12066 713/162 |
| 2012/0110334 | A1* | 5/2012 | Rossi | H04L 29/12066 713/176 |
| 2012/0117621 | A1* | 5/2012 | Kondamuru | H04L 29/12066 726/3 |

OTHER PUBLICATIONS

Kondamuru et al. US Patent Application Publication No. 2012/0117621's Provisional Application No. 61/410,460, filed Nov. 5, 2010 Drawings.*

Jim; SD3: a trust management system with certified evaluation; Published in: Security and Privacy, 2001. S&P 2001. Proceedings. 2001 IEEE Symposium on; Date of Conference: 2001; pp. 106-115; IEEE Xplore (Year: 2001).*

Mazières et al.; Separating key management from file system security; Published in: Proceeding SOSP '99 Proceedings of the seventeenth ACM symposium on Operating systems principles; 1999; pp. 124-139; ACM Digital Library (Year: 1999).*

Jim, "SD3: a trust management system with certified evaluation"; Published in: Security and Privacy, 2001. S&P. 2001. Proceedings 2001 IEEE Symposium on; Date of Conference 2001; pp. 106-115; IEEE Xplore.

Mazleres et al., "Separating key management from file system security", Published in Proceeding SOSP '99 Proceedings of the seventeenth ACM symposium on Operating systems principles; 1999, pp. 124-139, ACM Digital Library.

Extended European Search Report, issued from the European Patent Office, dated Aug. 7, 2012, in corresponding European Patent Application No. 12002986.3, 7 pages.

Nathan Meyer et al., "F5 and Infoblox DNS Integrated Architecture: Offering a Complete Scalable, Secure DNS Solution", Feb. 1, 2010, pp. 1-18, http://web.archive.org/web/20100326145019/http://www.f5.com/pdf/white-papers/infoblox-wp.pdf, accessed Mar. 5, 2012.

Gersch et al, "Deploying DNS Security (DNSSEC) in Large-Scale Operational Environments", Conference for Homeland Security, 2009, Catch '09, Cybersecurity Applications & Technology, IEEE, Piscataway, NJ, Mar. 3, 2009, pp. 169-180.

Ljunggren Kirei AB A-M Eklund-Lowinder Set Okubo Verisign F: "DNSSEC Signing Policy & Practice Statement Framework; draft-ieff-dnsop-dnssecAps-framework-00.txt", Internet Engineering Task Force, IETF; Standard Working Draft, Internet Society (ISOC) 4, Rue Des Falaises CH- 1205 Geneva, Switzerland, Nov. 25, 2009, pp. 1-28.

Testing and Implementation Requirements for the Initial Deployment of DNSSEC in the Authoritative Root Zone, Oct. 29, 2009, pp. 1-9.

J. Schlyter et al., DNSSEC Key Management Implementation for the Root Zone (Draft), May 11, 2010, pp. 1-14.

F. Ljunggren, DNSSEC Practice Statement for the Root Zone KSK Operator, May 21, 2010, pp. 1-40.

Icann, Policy on Transfer of Registrations on Registrars, http://www.icann.org/en/transfers/policy-en.html, Nov. 7, 2008, pp. 1-4.

Joseph Gersch et al., Deploying DNSSEC in Large-Scale Operations, CATCH Conference, Mar. 4, 2009, pp. 1-20.

Okubo et al., DNSSEC Practice Statement for the Root Zone ZSK Operator, May 28, 2010, pp. 1-37.

Patent Examination Report No. 1 dated Oct. 14, 2015, Australian Patent Application No. 2012202493, pp. 1-3.

Nidhal Odeh (Examiner), Patent Examination Report No. 1 dated Oct. 23, 2015, Australian Patent Application No. 2012202458, pp. 1-3.

* cited by examiner

FIG. 3 (300): PACKET LENGTH | PROTOCOL VERSION | SERVICE TYPE | TRANSACTION ID | FLAGS | SESSION ID | ACCOUNT ID | NUMBER OF RECORDS | SIGNING REQUEST DATA | SIGNING REQUEST DATA | SIGNING REQUEST DATA

FIG. 4 (310): LENGTH | ALGORITHM | KEY ALIAS | REQUEST DATA LENGTH | REQUEST DATA

FIG. 5 (320): LENGTH | RRSIG ID | DOMAIN NAME | DOMAIN ID | PARENT DOMAIN | TYPE COVERED | NUMBER OF LABELS | ORIG TTL | TTL | RR START TIME | RR SET BYTE LENGTH | RR SET BYTES

DNSSEC SIGNING SERVER

CROSS-REFERENCE TO RELATED APPLICATIONS

The present application is a divisional application of U.S. patent application Ser. No. 14/841,080 filed on Aug. 31, 2015, which is a continuation application of U.S. patent application Ser. No. 13/098,940 filed on May 2, 2011, now U.S. Pat. No. 9,130,917 issued on Sep. 8, 2015, the entireties of which are incorporated by reference herein.

BACKGROUND OF THE INVENTION

The Domain Name System (DNS) is the part of the Internet infrastructure that translates human-readable domain names into the Internet Protocol (IP) numbers needed to establish TCP/IP communications over the Internet. That is, DNS allows users to refer to web sites, and other resources, using easier to remember domain names, such as "www.en.example.com," rather than the numeric IP addresses, such as "123.4.56.78," which are machine readable addresses used by software to communicate with computers on the Internet. Each domain name is made up of a series of character strings (labels) separated by dots. The right-most label in a domain name is known as the "top-level domain" (TLD). Examples of well-known TLDs are ".com"; ".net"; ".org." etc. Each TLD supports second-level domains, listed immediately to the left of the TLD, e.g., "example" in "www.example.com." Each second-level domain can support a number of third-level domains located immediately to the left of the second-level domain, e.g., "en" in "www.en.example.com." There can be additional level domains as well. For example, a domain with additional domain levels could be www.landscape.photos.example.com.

It should be noted that a single IP address, e.g., one assigned to a single server, can support numerous domain names. That is, different domain names may resolve to the same server, that can then determine what content to provide based on the requested domain name and/or additional non-domain information. This is sometimes referred to as virtual hosting.

Additional non-domain information may be included in a Uniform Resource Identifier ("URI") structure that includes the domain name. For example, a "path" part is a sequence of segments separated by a forward slash ("/"). This information may be included immediately to the right of the domain name, such as the "blog" in "www.example.com/blog/today.htm," and may be used by a server or other receiving device to identify and deliver specific content or run particular code. Other examples of non-domain information may include queries and fragments, the specifics of which are understood by those of ordinary skill in the art and are not discussed in detail herein. Combinations of this information may be included in web page hyperlinks that navigate a user to another section of the same page or to another web page.

Thus, as can be seen in the various examples provided above, and as appreciated by those of skill in the art, a domain, such as the second level domain "example.com", may contain a variety of different Internet accessible information with different addresses and other means of identification.

The actual registration of domain names is performed by companies referred to as domain name registrars ("registrars"). Registrars register domain names with registries. For example, an end user submits to a registrar a domain name for registration and provides an IP address to which the domain name should resolve. The registrar communicates with the registry to create a registry database record that can be used to resolve the domain name to the IP address provided by the end user and indicates the identity of the registrar through which the domain name was registered. Except for the expiration of the domain name registration at the registry, typically only the registrar designated in the domain name record at the registry can modify or delete registry database information about a domain name. An end user can switch registrars by following certain domain transfer procedures. Registrars may also act as a hosting provider, or the end user may have the domain hosted by a separate third-party domain hosting service.

A zone file is a text file that describes a portion of the DNS called a DNS zone. A zone file is organized in the form of resource records (RR) and contains information that defines mappings between domain names and IP addresses and other resources. The format of zone files is defined by a standard, with each line typically defining a single resource record. A line begins with a domain name, but if left blank, defaults to the previously defined domain name. Following the domain name is the time to live (TTL), the class (which is almost always "IN" for "internet" and rarely included), the type of resource record (A, MX, SOA, etc.), followed by type-specific data such as the IPv4 address for A records. Comments can be included by using a semi-colon and lines can be continued by using parentheses. There are also file directives that are marked with a keyword starting with a dollar sign.

The DNS distributes the responsibility of assigning domain names and mapping those names to IP addresses by designating authoritative name servers for each domain. Authoritative name servers are assigned to be responsible for their particular domains, and in turn can assign other authoritative name servers for their sub-domains. This mechanism generally helps avoid the need for a single central register to be continually consulted and updated. The DNS resolution process allows for users to be directed to a desired domain by a reverse lookup process whereby the user enters the desired domain, and the DNS returns appropriate IP numbers. During the DNS resolution process, a request for a given domain name is routed from a resolver (e.g. a stub resolver) to an appropriate server (e.g. a recursive resolver) to retrieve the IP address. To improve efficiency, reduce DNS traffic across the Internet, and increase performance in end-user applications, the DNS supports DNS cache servers that store DNS query results for a period of time determined by the time-to-live (TTL) of the domain name record in question. Typically, such caching DNS servers, also called DNS caches, also implement the recursive algorithm necessary to resolve a given name starting with the DNS root through to the authoritative name servers of the queried domain. Internet service providers (ISPs) typically provide recursive and caching DNS servers for their customers. In addition, home networking routers may implement DNS caches and proxies to improve efficiency in the local network.

Although the distributed nature of the DNS provides significant advantages in terms of the efficiency of the overall system it also makes the system vulnerable to certain types of malfunctions and/or attacks at various nodes in the system. One particular problem that can occur is referred to as DNS cache poisoning. DNS cache poisoning occurs when data are introduced into a DNS name server's cache database that did not originate from authoritative DNS sources.

This may result from deliberate attacks on a name server, or it may be an unintended result of, for example, a misconfigured DNS cache or improper software design of a DNS applications. Thus, DNS cache poisoning can result in (1) resolution requests failing, such as when inaccurate or misconfigured IP address information is provided, or (2) a requesting user's resolution request being directed to a malicious site that spoofs the genuine domain and is used to illicitly obtain information such as account passwords, or to distribute malicious content, such as computer worms or viruses, that are delivered to the requesting user.

The Domain Name System Security Extensions (DINSSEC) is a suite of Internet Engineering Task Force (IETF) specifications for securing certain kinds of information provided by the DNS as used on IP networks. DNSSEC provides for the signing of DNS-ready zone files, ensuring origin authentication and data integrity for DNS data, as well as authenticated denial of existence. In general, answers provided within DNSSEC are digitally signed, and, by checking the digital signature, a DNS resolver is able to check if the information corresponds to the information on the authoritative DNS server. DNSSEC uses public-key cryptography for the digital signatures and authentication. The DNSKEY record is authenticated via a chain of trust, starting with a set of verified public keys for the DNS root zone, which is a trusted third party.

To implement DNSSEC, several new DNS record types were created or adapted to use with DNSSEC, including RRSIG, DNSKEY, DS, NSEC, NSEC3 and NSEC3PARAM. For example, when DNSSEC is used, each authoritative answer to a DNS lookup will contain an RRSIG DNS record in addition to the record type that was requested. The RRSIG record is a digital signature of the answer DNS resource record set. The digital signature can be verified by locating the correct public key found in a DNSKEY record. The DS record is used in the authentication of DNSKEYs in the lookup procedure using the chain of trust. NSEC and NSEC3 records are used to provide the authenticated denial of existence responses for DNS records that do not exist.

The requirements of DNSSEC involve the use of different keys, stored both in DNSKEY records and from other sources to form trust anchors. There are, for example, Key Signing Keys (KSKs), which are used to sign other DNSKEY records, and Zone Signing Keys (ZSKs), which are used to sign other records. Because the ZSKs are under the control and use of a specific DNS zone, they can be switched more easily and more often. As a result, ZSKs can generally be much shorter (in terms of byte length) than KSKs, while still offering an acceptable level of protection.

Although protocols have been developed for the employment of DNSSEC, including the use of KSKs and ZSKs, there are numerous aspects of operating DNSSEC enabled domains, at the registrar and registry levels, that have not been addressed and/or optimized for large-scale use. For example, the ability to process large numbers of signatures in short periods of time, is limited to the common practices of using stand-alone signing systems and signing entire zones based on changes to the zone. Additionally, may solutions are limited to individual users, or a limited number of domains etc. that may be managed by a particular DNS provider. Accordingly, there are ongoing needs to further improve the functionality and/or efficiency of operations related to DNSSEC management and the signature functions required for DNSSEC records.

SUMMARY OF THE INVENTION

Most current DNSSEC techniques involve signing of DNSSEC data within limited zone-management and zone-serving applications, e.g. limited by user, DNS providers, etc. Currently, users wishing to adopt DNSSEC have the following basic options:

1. Build their own DNSSEC solution using a combination of third party and open source software along with a set of either software keys or hardware keys.

2. Use a DNSSEC key management and a signing appliance like Secure64® DNS Signer, BlueCat Networks, Xelerance DNSX Secure, Signer, and Infoblox. Such appliances may provide various aspects of key management and zone signing, but require hardware to be installed at the client's site. It should be noted that DNSSEC key management and signing appliances require installation of hardware at the user's site, require more hands-on management of key material, and do not support more than a single user.

3. Use a Managed DNS solution that has been updated to support DNSSEC. Managed DNS providers include zone management and zone publishing features. DNSSEC enablement allows a client to "turn on" DNSSEC for a managed DNS zone, but require the user to migrate or outsource their DNS hosting to the managed DNS provider.

However, with the introduction of DNSSEC into vast registries, such as the .com and .net registries, inefficiencies in the various signing techniques for DNSSEC data, particularly with respect to large zones, bring the potential for resolution problems including delays and resolution failures. Such problems can have significant detrimental effects on e-commerce and other high-traffic sites.

The present subject matter may provide benefits in the efficient signing of DNSSEC enabled zones through the use of a network accessible signing server that allows for a remote application to manage the signing, and also to remotely sign portions of zone data as needed. According to aspects of the invention, the use of a network accessible signing server may provide for the de-coupling of the zone-management and zone-serving application from the signing mechanism, compared to other techniques in which those functions are essentially merged, e.g. in techniques where the nameservers perform the signing, or in cases where a specific zone-management device does the signing.

Through the use of, for example, an extensible, network accessible, signing server, exemplary configurations may also reduce, or eliminate, the need to manually configure various functions of the signing server compared to other known techniques. A network accessible signing server may also provide support for a wide range of DNSSEC applications without the need for manual configuration, such as:

1. Inline signing of resource records in a high-volume DNSSEC application, e.g. a TLD registry.

2. Dynamically creating keys, loading keys, unloading keys, and using the keys to sign zone data in a DNSSEC application with many keys and zones.

3. Signing an entire zone in an offline/batch DNSSEC application, e.g. a ROOT zone.

In embodiments, systems and methods for performing DNSSEC signing may be performed by a signing server that is configured to interact with a separate client application. Exemplary methods may generally include receiving a signing request at the signing server from the client application to sign first data. The signing server may determine appropriate signing keys and/or protocols for the first data. The first data may then be transmitted by the signing server to a digital signature module, which may include, for example, a hardware support module, or software signing applications. The signing server may receive a digitally signed version of the first data from the digital signature module, and provide the signed first data to the client application.

According to first aspects of the invention, a DNSSEC signing server may be configured to interact with at least one DNSSEC client application and a digital signature module. The DNSSEC signing server may include, for example, a processor, and a storage device including computer readable code that, when executed by the processor, causes the signing server act as an authoritative signing server configured to receive a signing request from the at least one client application to sign first data. The first data may include, for example, DNS data.

In embodiments, the signing server may determine an appropriate signing key, e.g. at least one of an active KSK and an active ZSK, for the first data. Appropriate keys, such as the at least one active KSK and active ZSK, may be determined based on, for example, a TLD identifier included in the signing request. In embodiments, the signing server may be configured to determine more than one active signing key and/or active signing algorithm for the first data, and may request a plurality of different signatures for the first data based on the more than one active signing key and/or active signing algorithm.

In embodiments, the signing server may transmit the first data to one of a plurality of digital signature modules, and may receive a digitally signed version of the first data from the digital signature module. The signing server may also be configured to provide the signed first data to the client application.

In embodiments, the signing server may be configured to distinguish a requested signing function from among plurality of different digital signing functions based on a service type identifier included in the signing request, and to route non-DNSSEC signing requests to a non-DNSSEC digital signature module based on the service type identifier.

According to further aspects of the invention, the signing server may also be configured to receive, as part of the same signing request, a request to sign second data. The second data may be, for example, DNS, or other, data. The signing server may determine an appropriate signing key, e.g. at least one of an active KSK and an active ZSK, for the second data, which may be different than the key to be used with the first data. For example, the signing server may determine a first set of keys for the first data and a second set of keys for the second data.

In embodiments, the signing server may transmit the second data to one of a plurality of digital signature modules, and receive a digitally signed version of the second data from the digital signature module. The signing server may also be configured to provide the signed second data to the client application.

Embodiments may include wherein the signing server is configured to receive multiple signing requests as part of a single request packet, and parse the request packet to identify different signing requests having at least one of different active KSKs, active ZSKs, and signing protocols from one another.

In embodiments, the digital signature modules may be configured to sign certain parts of DNS data according to a DNSSEC protocol, without signing an entire zone.

In embodiments, the signing server may also be configured to provide an additional non-DNSSEC digital signature function.

In embodiments, each of the digital signature modules may include a Hardware Support Module (HSM), that is physically separate from the processor of the signing server and that is configured to digitally sign data provided by the signing server.

In embodiments, the HSM may include a plurality of keys identified by alias identifiers. The signing server may be configured to pass an alias identifier for an appropriate key to be used, such as at least one of a KSK and a ZSK for the DNS data to the digital signature module, without passing the at least one KSK and ZSK to the digital signature module.

In embodiments, the signing server may be configured to periodically check a database of active keys, e.g. active KSKs or ZSKs, and to determine which alias identifiers are active for a given time based on information received from the database. In embodiments, the alias identifier passed to the digital signature module may be an active alias identifier.

In embodiments, the signing server may be configured to identify a specific HSM to send the first data to based on the at least one active KSK and/or active ZSK.

In embodiments, the signing server may be configured to process requests regarding domains under different TLDs.

In embodiments, the signing server may be configured to process requests regarding at least two domains managed by a plurality of registrars.

In embodiments, communications between the client and the signing server may be performed, for example, via two-way SSL.

As discussed herein, exemplary signing servers may support various DNS operations signing operations including, for example, DNSSEC signature functions, other managed DNS services, remote signing, root zone signatures, and the like, implemented by myriad different systems. In embodiments, exemplary signing servers may be configured to support, for example, signing of affected DNSSEC records as part of a single transaction, i.e. an atomic, consistent, isolated and durable unit of work, aspects of which may be referred to herein as "inline signing."

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention claimed. The detailed description and the specific examples, however, indicate only preferred embodiments of the invention. Various changes and modifications within the spirit and scope of the invention will become apparent to those skilled in the art from this detailed description.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced. In the drawings:

FIG. 3 depicts an exemplary signing request protocol according to aspects of the invention.

FIG. 4 depicts an exemplary signing request data protocol according to aspects of the invention.

FIG. 5 depicts another exemplary signing request data protocol according to aspects of the invention.

DETAILED DESCRIPTION OF THE INVENTION

Figure 1:
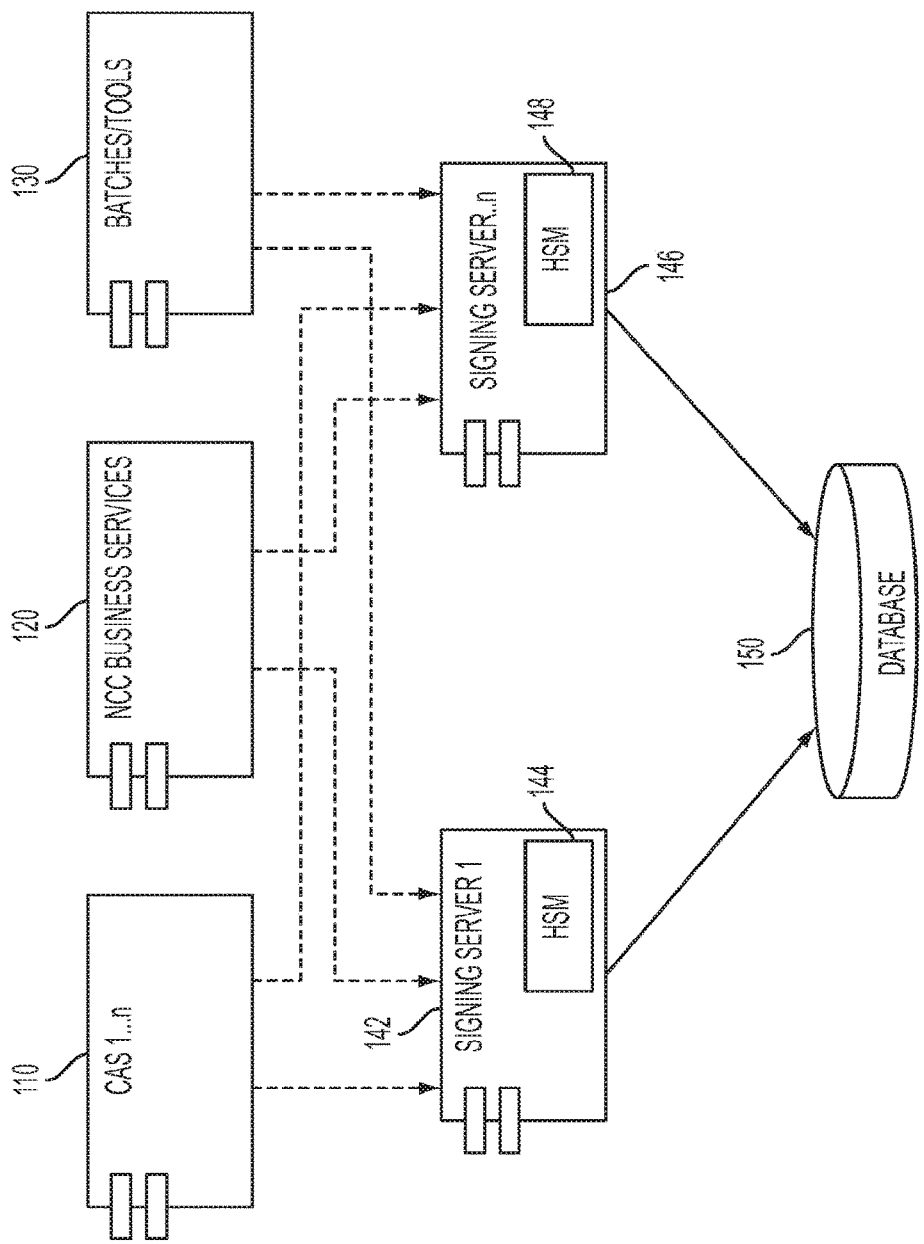
FIG. 1 depicts details of an exemplary DNSSEC-enabled signing system according to aspects of the invention.

It is understood that the invention is not limited to the particular methodology, protocols, etc., described herein, as these may vary as the skilled artisan will recognize. It is also to be understood that the terminology used herein is used for the purpose of describing particular embodiments only, and is not intended to limit the scope of the invention. It also is to be noted that as used herein and in the appended claims, the singular forms "a," "an," and "the" include the plural reference unless the context clearly dictates otherwise. Thus, for example, a reference to "a server" is a reference to one or more server and equivalents thereof known to those skilled in the art.

Unless defined otherwise, all technical terms used herein have the same meanings as commonly understood by one of ordinary skill in the art to which the invention pertains. The embodiments of the invention and the various features and advantageous details thereof are explained more fully with reference to the non-limiting embodiments and examples that are described and/or illustrated in the accompanying drawings and detailed in the following description. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the invention. The examples used herein are intended merely to facilitate an understanding of ways in which the invention may be practiced and to further enable those of skill in the art to practice the embodiments of the invention. Accordingly, the examples and embodiments herein should not be construed as limiting the scope of the invention, which is defined solely by the appended claims and applicable law. Moreover, it is noted that like reference numerals reference similar parts throughout the several views of the drawings.

As used herein, unless otherwise limited, a registrar may be understood to be any entity or organization that interacts with a domain-name registry and allows registrants to create and update domain-name resources.

As used herein, unless otherwise limited, a registrant may be understood to be any person or organization that interacts with a registrar to create and update a domain-name resource.

As used herein, unless otherwise limited, a DNS hosting provider may be understood to be any entity or organization that hosts content on its servers on behalf of a registrant, providing DNS provisioning and resolution capabilities for that content (e.g., assigns IP addresses and operates nameservers capable of resolving domain names to those IP addresses that it manages).

Embodiments of the invention may provide network accessible DNSSEC signing techniques to allow large-scale DNSSEC providers, such as registries, to process large numbers of DNS changes, including DNSSEC signature data, from various sources in an efficient and coherent manner.

Zone Signing Overview

As described above, DNSSEC was designed to deal with cache poisoning and a set of other DNS vulnerabilities such as man in the middle attacks and unauthorized data modification in authoritative servers. Its major objective is to provide origin authentication and integrity protection for DNS data. The public key infrastructure (PKI) may be used as means of public key distribution. DNSSEC provides a verification mechanism for DNS data and is not an encryption mechanism. It allows a security-aware resolver to verify that the zone data that has been received is signed by the administrator of the zone who holds the private key.

The DNSKEY Resource Record

A zone may have one or more key pairs, each of which includes private key and public key. The private keys may be stored securely in a domain name database and used to sign zone data. The public keys may be stored in the database and also stored in the signed zone data as DNSKEY resource records. The public keys are used to verify zone data, DNSKEY records typically have the following data elements:

Flags: "Zone Key" and "Secure Entry Point"

Protocol: Fixed value of 3 (for backwards compatibility) Algorithm: The public key's cryptographic algorithm. Public key: Public key data.

A DNSKEY Resource Record ("RR") may be either a Zone Signing Key (ZSK) or a Key Signing Key (KSK). The Key Signing Keys (KSKs) will have a SEP flag set so that they can be distinguished from the ZSKs in the DNSKEY RRset. The Key Signing Keys (KSKs) are used to sign other DINSKEY resource records and are used to build a chain of authority to the data that needs to be validated.

The RRSIG Resource Record

The RRSIG resource record holds the DNSSEC signature of a resource record set RRset (one or more DNS records with the same name, class, and type). DNSSEC enabled resolvers can verify the signature with a public key stored in a DNSKEY-record. The RRSIG records have the following data elements:

Type Covered: DINS record type that this signature covers. Algorithm: Cryptographic algorithm used to create the signature. Labels: Number of labels in the original RRSIG-record name (used to validate wildcards). Original TTL: TTL value of the covered record set. Signature Expiration When the signature expires. Signature Inception When the signature was created. Key Tag: A short numeric value which can help quickly identify the DNSKEY-record which can be used to validate this signature. Signer's Name: Name of the DNSKEY-record which can be used to validate this signature, Signature: Cryptographic signature.

The DNSKEY RRs are signed by both active KSKs and ZSKs. Other RR sets are signed by only active ZSKs.

The NSEC Resource Record

The NSEC resource record lists two separate things: the next owner name (in the canonical ordering of the zone) that contains authoritative data or a delegation point NS RRset, and the set of RR types present at the NSEC RR's owner name (RFC3845). The complete set of NSEC RRs in a zone indicates which authoritative RR sets exist in a zone and also form a chain of authoritative owner names in the zone. These records can be used by resolvers to verify the non-existence of a record name and type as part of DNSSEC validation, NSEC-records have the following data elements:

Next domain name: The next record name in the zone (DNSSEC sorting order) Record types: The DNS record types that exist for the name of this NSEC-record.

The NSEC3 Resource Record

The NSEC3 Resource Record (RR) provides authenticated denial of existence for DNS Resource Record Sets. The NSEC3 RRs have the same functionality as NSEC RR, except NSEC3 uses cryptographically hashed record names to prevent enumeration of the record names in a zone. An NSEC3-record links to the next record name in the zone (in hashed name sorting order) and lists the record types that exist for the name covered by the hash value in the first label of the NSEC3-record's own name. These records can be used by resolvers to verify the non-existence of a record name and type as part of DNSSEC validation. NSEC3-records have the following data elements:

Hash Algorithm: The cryptographic hash algorithm used. Flags: "Opt-out" (indicates if delegations are signed or not). Iterations: How many times the hash algorithm is applied. Salt: Salt value for the hash calculation. Next Hashed Owner Name: The name of the next record in the zone (in hashed name sorting order). Record Types: The record types that exist for the name covered by the hash value in the first label of the NSEC3-record's own name.

Aspects of an exemplary signing server arrangement are shown in FIG. 1. As shown in FIG. 1, a registry, or other DNSSEC service provider, may include any number of Signing Servers 142, 146. For example, a plurality of signing servers may be including a registry provisioning system. Signing Servers 142, 146 may include Hardware Support Modules (HSMs) 144, 148, respectively, and/or software, which may include the actual digital signature functionality including appropriate digital signature keys. Signing Servers 142, 146 may communicate, and for example, exchange signed and unsigned DNS data, with various applications, services and tools 110, 120, and 130. Each CAS 110, NCC Plugin Business Services 120, and Batch/Tool 130 component will have connectivity to the signing server (preferably to a set of such servers). Signing Servers 142, 146 may persist signed DNS data to a database 150. Additional details of an exemplary data flow among the applications, signing servers, HSMs, and databases are shown in FIG. 2.

Figure 2:
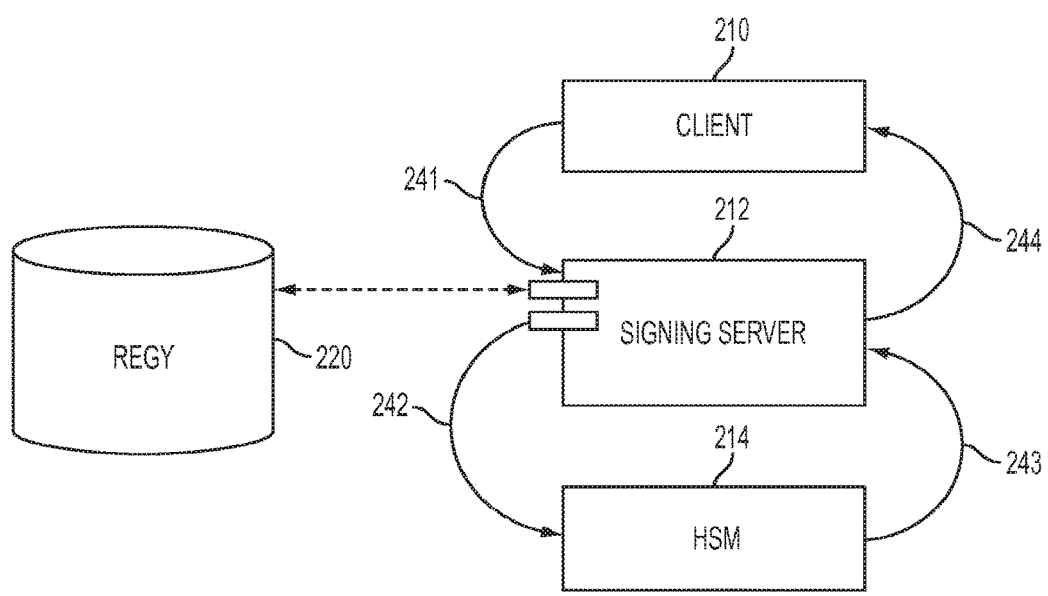
FIG. 2 depicts further details of a DNSSEC-enabled signing system according to aspects of the invention.

As shown in FIG. 2, client 210 may represent, for example, a front end service of a provisioning system, which may be configured to identity DNSSEC data that needs to be signed by the signing server 212. The data to be signed may be, for example, a portion of zone data affected by a DNS change, e.g. add, update, delete commands for a domain. The DNSSEC, or other, data to be signed may be parsed or otherwise identified based on, for example, a domain command, and provided to the signing server 212, as shown by link 241. The communication between the client 210 and signing server 212 may be, for example, by two-way SSL tunnel. Information such as bytes, keyType (ZSK, KSK) and TLD may be included in the request. The signing server 212 may identify the appropriate key information and/or HSM from the transmission 241, and pass the unsigned data to the appropriate HSM 214, shown by link 242. This may include a sign command with, for example, the bytes, keyAlias, and signature algorithm.

In embodiments, the signing server 212 may also receive, as part of the same signing request, a request to sign other data. The signing server 212 may determine appropriate key information for the other data. In embodiments, and as described further herein, the key information for the other data may be different than key information for first data included in the same signing request.

Requests 241 from the client 210 to signing server 212 may be formatted according to a Signing Server Protocol (SSP). In embodiments, exemplary protocols may include a "boxcar" format, wherein multiple signing requests may be packaged into a single protocol request, thus optimizing on performance-degrading network round trips and bandwidth utilization. Additionally, the SSP may include a built-in diagnostic feature that each service module may adhere to, allowing clients to determine the service's availability state and recent problems. In embodiments, protocols described herein may allow for, among other objects, instant pluggability of new data-transfer packet formations required by new service modules added to the signing server without a change to the transfer protocol itself. An exemplary SSP is shown in FIG. 3, and described further below.

As shown in FIG. 3, a Signing Server Request Protocol 300 from a client may include fields for:

Packet Length::=int (Total Length of the packet)
Protocol Version::=byte (Version of the Protocol)
Service Type::=byte (e.g. Simple (for generic signing); DNSSEC (for DNSSEC signing); Public key retrieval (given a key alias, returns the public key)).
Transaction Id::=Long (Unique id to recognize the request)
Flags::=int (Field that allows requests to pass in flags (service-agnostic).
Session Id::=Long (The session Id sending the request, may be used for auditing purposes).
Account Id::=Long (The account Id sending the request, may be used for auditing purposes).
Number of Records::=byte (Number of request data (i.e., number of packets contained in the overall request on which the service needs to take action)) Signing Request Data1 . . . n-Packet(s) of data upon which the service needs to act; typically, this would include data to be signed.

Client 210 may send Signing Request Data as payloads inside of their requests 300. In embodiments, a signing server 212 may be configured to recognize and act on different service requests and to interpret the data payloads based on, for example, an associated codec. In embodiments, data may be structured in various forms, which may be referred to as "Signing Request Data Protocols," including, for example, SimpleSigningRequestData, RRSigSigningRequestData, or PublicKeyRetrievalRequestData, discussed further below.

FIG. 4 shows an example of a Simple Signing Request Signing Request Data Protocol. As shown in FIG. 4, a Simple Signing Request 310 may include:

Length::=int (Length of the data)
Algorithm::==String (Signature Algorithm)
Key Alias::=String (Key Alias that needs to be used for signing)

Request Data Length::=int (Length of the Request Data field)

Request Data::=byte (The data that needs to be signed by Signing Server)

As mentioned above, the client 210, signing server 212 and HSM 214 may use key aliases to identify particular keys. Accordingly, the various components need not exchange actual keys, which may be advantageous in maintaining the security of key material, particularly keys that may be maintained in a particular component, e.g. the HSM 214, in an essentially inaccessible state (i.e. not accessible via the network).

An RRSigSigningRequestData, such as shown in FIG. 5, may be used to implement Signing Request Data, in a similar manner to the SimpleSigningRequest. The RRSigSigningRequestData may be, for example, a data bean, populated by the client, holding information about the RRSIG record that needs to be signed. As discussed further below, each class of request may be returned by the signing server 212 as a corresponding response 244. It should be noted that, when the signing server 212 receives a request 241, it may augment the request data with DNSSEC-related data, or other data, of its own.

An RRSigSigningRequestData 320 may include:
Length::=int (Length of the data)
RRSIG ID::=Long (Unique ID of the RRSigSigningRequestData)
Domain Name::=: String (The name of domain)
Domain Id:: =Long (The id of the domain)
Parent Domain::=String (The parent domain)
Type Covered::=int (The Resource Record Type)
Number of Labels::=int (The number of labels in the domain name)
Orig TTL::=Long (The data that needs to be signed by Signing Server)
TTL::=Long (The data that needs to be signed by Signing Server)
RR Start Time::=Long (The Epoch time of the RRSIG start time)
RRSet Bytes Length::=int (Length of the RRSet Bytes)
RRSet Bytes::=byte (The data that needs to be signed by Signing Server)

Accordingly, considering the combination of the Signing Server Request Protocol 300 shown in FIG. 3, the SimpleSigningRequestData 310 shown in FIG. 4, and the RRSigSigningRequestData 320 shown in FIG. 5, appropriately configured signing servers may accept a single signing request (e.g. via Signing Server Request Protocol 300) with multiple Signing Request Datum, each Signing Request Data having potentially different signing algorithms, key aliases, etc. As described further herein, in the case of RRSigning data, appropriate algorithms and/or keys may be based, for example, on identified domains, and/or TLDs associated with the request. In embodiments, the signing server may be configured to process requests regarding domains under different TLDs, and/or process requests regarding at least two domains managed by a plurality of registrars, through the parsing of the requests and data packages described herein.

Signing Request Data Protocol may also include a PublicKeyRequestData (not shown) including the following fields:
Length::=int (Length of the data)
Key Alias::=String (The Key Alias for retrieving the Public Key)

The signing server 212 may be configured to periodically check with the database 220 for the authoritative data on which key alias to use when sending data to the I-ISM 214. The signing server 212 may also be configured to identify a specific HSM to send the data packages to based on an active KSK and/or active ZSK. The HSM 214 may be loaded with many keys per TLD at initialization time (some may be ZSKs, some may be KSKs) and each key may be known to the HSM 214 by an alias, keyAlias. The client 210 may be configured to tell the signing server 212 which of the two kinds of key to use (ZSK or KSK) and the TLD, and the signing server 212 may be configured to identify the current key-alias name for that kind of key when it communicates with the HSM for signing. The signing server 212 may also be forced to re-check with the database 220 for the current key aliases. This command can be issued, for example, to the signing server 212 via a JMX management interface. Accordingly, the signing server 212 may be understood as "DNSSEC-aware."

One advantage of making the signing server DNSSEC-aware is to save the marshalling and unmarshalling of data that the client would otherwise have to pass with almost every signing request, even though those data do not change. That is, data that do not change frequently do not need to be known by the client 210 or sent by the client 210 with every request 241. Rather, those data can be known by and cached by the signing servers 212 themselves.

The signing server 212 may also be configured to provide generic signing capabilities as well. Examples may include configuring the signing server for use with a Managed DNS Service that has a large number of keys and zones (thousands or millions) to create various signatures for managed DNS services, root zone signing, etc. In embodiments, the client may be configured to provide signing parameters along with the ability to dynamically load and unload keys used for signing. A "generic signing" signing server capable of performing multiple types of signature transactions may provide a flexible application for use with, for example, a large-scale, multi-function, managed DNS service. Thus, the signing server 212 may be DNSSEC-aware, and capable of working for other signing purpose, for example, via runtime-configurable plugins (services) that the server may rely on for handling incoming requests. According to aspects of the invention, the signing server framework, such as shown in FIG. 2, may allow for various parties to write service modules, including different parameters and keys, which may communicate with various brands of hardware or software signer applications. Additional functions can be added to the protocol to support new features without interfering with existing clients. The configurations of the signing server and the signing server protocols may allow, for example, a DNSSEC application to include other variously defined end-user interfaces (e.g. Web Services, EPP, REST) without impacting the underlying signing.

Embodiments may include a signing server codebase with service modules that provide a combination of caching and non-caching of signing-configuration parameters. Service modules may thus re-use these caching and non-caching features depending on their needs. Caching may be used to increase performance for service modules that have relatively stable keys and signing configurations, whereas non-caching may facilitate the loading of keys and signing parameters on-demand for situations necessitating high volumes of keys and parameters stored offline and activated only at the time of signing. Additionally, when individual service modules malfunction or become unavailable, as may happen with different protocols and keys, the signing server itself can remain robust and allow its other modules to continue servicing requests. Such flexibility can provide myriad options that are not achievable by, for example, current stand-alone DNSSEC signing applications.

One particular advantage of the non-caching approach, e.g. where all the applicable keys are not cached in the HSM or other signature module, is that the keys which are digitally wrapped can be stored in a less expensive and higher available repository, such as a database that is easy to replicate across data centers and the like. The HSM or other signature module may then retrieve the keys, as needed, to sign data. Such separate storage, and as-needed loading, of the actual keys has been found by the inventors to enable an overall signing service such as described herein to scale to a much larger number of keys without sacrificing the performance capability of an HSM or the availability of the databases used. This has been found to be particularly useful in the context of enormously-scaled DNS services, such as may be provided by a registry, that may need to access keys for thousands to millions of zones.

In embodiments, an HSM or other signature module, may encrypt relevant keys stored in a database with a private key of the HSM or other signature module. As described further herein, each key may be identifiable by a keyAlias, and may be decrypted by the HSM or other signature module, using the private key, when retrieved.

Returning to FIG. 2, the HSM 214 may sign the DNSSEC data as received, for example, in request 242, with an appropriate key, and pass the signed data back to the signing server 212 as shown by link 243. In embodiments, such signing may be based on, for example, identification of appropriate keys and/or protocols from key aliases and the like included in the request. Alternatively, HSMs, or other software signature applications, may have predetermined keys and/or parameters to apply to the signing requests directed to them. It should be noted that, according to aspects of the invention including the separately identified data packets contained in the signing request, the packets can be processed asynchronously so that the client can continue processing without blocking for the signing response. Further, a single signing server can receive and act on requests to sign data across applications and across zones simultaneously. That is, the single server can receive in a single request packet commands to sign data that are unrelated to one another, across zones and/or applications.

Additionally, the signing server 212 may be configured to request and provide multiple signatures for a single data packet. For example, the signing server 212 may recognize more than one active key and/or algorithm to be applied to certain data and may request a plurality of signatures from the HSM or other signature module based on the more than one active key and/or algorithm. In embodiments, the signing server 212 may be configured to request and report the signing of, for example, first data with a first key by a first algorithm, and the first data with a second key by a second algorithm. Multiple active keys and signatures may be applied, for example, according to user requirements, in the context of key rollovers and/or for DNSSEC to effectively implement an algorithm roll (e.g. SHA-1 to SHA-2).

The HSM 214 may be physically separate from the processor of the signing server 212, and may include, for example, additional security protocols to safeguard the keys stored in the HSM 214. For example, the HSM 214 may be configured to exchange certain key information only through physical loading procedures to safeguard keys stored therein, particularly those with long service life or wide applicability, e.g. KSKs. In embodiments, the HSM may include one or more keys, and one or more alias identifiers that identify the keys stored therein.

The signing server 212 may pass signed data, e.g. DNSSEC or other digitally signed data, or other data such as transaction commit information, back to the client 210 as shown by link 244.

As noted above, each class of request may be returned by the signing server 212 as a corresponding response 244. The response 244 returned by the signing server 212 may be configured to follow a Signing Server Response Protocol as shown in FIG. 6.

Figure 6:
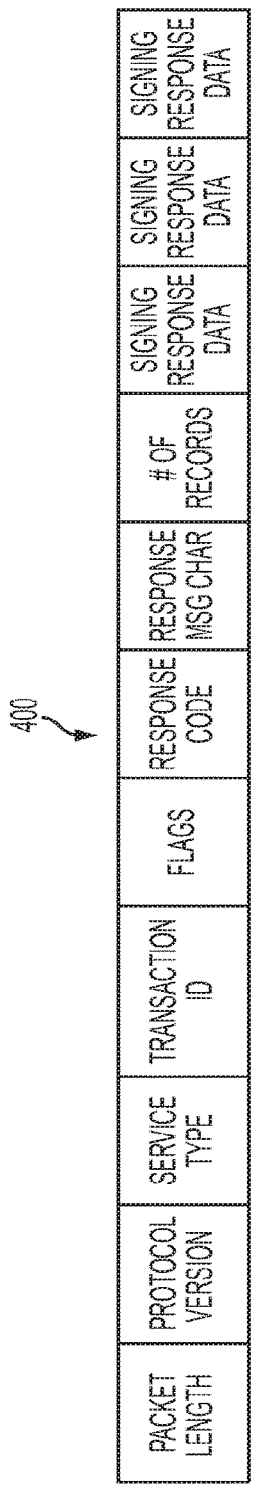
FIG. 6 depicts an exemplary signing response protocol according to aspects of the invention.

As shown in FIG. 6, the Signing Server Response Protocol 400 may include, for example:

Packet Length::=int (Total Length of the packet)

Protocol Version::=byte (Same as what was sent in the request)

Service Type::=byte (Same as what was sent in the request)

Transaction Id::=long (Same as what was sent in the request)

Flags::=int (Field that allows requests to pass in flags (service-agnostic).

Response Code::=byte (The response code after processing the request. See below for response codes that can be returned by Signing Server.) Response Message Length::=int (The length of detailed response message for the response returned by the server.)

Response Message Characters::char (The response message characters).

Number of Records::=byte (Number of response data (i.e., number of packets contained in the overall request on which the service needs to take action).)

Signing Response Data1 . . . n.

Exemplary Signing Response Codes are shown in Table 1:

TABLE 1

| Response Code | Response Description |
|---|---|
| 0 | Successful |
| 1 | Request Failed |
| 2 | Request Failed due to database failure |
| 3 | Request Failed due to Signing Engine failure |
| 4 | Request Failed due to Unsupported Service Request |
| 5 | Public key not found for key alias |

The Signing Response Data may include, for example, SimpleSigningResponseData, RRSigSigingResponseData, or PublicKeyRetrievalResponseData, corresponding to the Request, i.e. SimpleSigningRequestData, RRSigSigingRequestData, or PublicKeyRetrievalRequestData. In embodiments, there may be one response data object for each request-data packet sent in the Request.

Figure 7:
FIG. 7 depicts an exemplary signing response data protocol according to aspects of the invention.

An example SimpleSigningResponseData 410 is shown in FIG. 7, as would be returned, for example, by the signing server 212 as response to a SimpleSigningRequest, such as shown in FIG. 4. As shown in FIG. 7, the fields of the SimnpleSigningResponseData 410 may include:

Length::=int (Length of the data)

Signed Data Length::=int (Length of the Signed Data Field)

Signed Data::=byte (The data that needs to be signed by Signing Server)

Figure 8:
FIG. 8 depicts another exemplary signing response data protocol according to aspects of the invention.

FIG. 8 shown an example of an RRSigSigingResponseData 420, which may used for each response-data packet resulting from an RRSIG-related request, such as shown in FIG. 5. The fields of the RRSigSigingResponseData 420 may include:

Length::=int (Length of the data)
RRSIG ID::=Long (Unique ID of the RRSigSigingRequestData)
Domain Name::=String (The name of domain)
Domain Id::=Long (The id of the domain)
Parent Domain::=String (The parent domain)
Type Covered::=int (The Resource Record Type)
Number of Labels::=int (The number of labels in the domain name)
Orig TTL::=Long (The data that needs to be signed by Signing Server)
TTL::=Long (The data that needs to be signed by Signing Server)
RR Start Time::=Long (The Epoch time of the RRSIG start time)
Key Tag::=int (The Key tag of the Key that was used to sign this request)
Algorithm Id::=int (The Algorithm Id that was used to sign this request)
Signature::=String (The base 64 encoded Signature generated by signing the request)
RR End Time::==Long (The Epoch time of the RRSIG End time) Signing Response Data may also include a PublicKeyResponseData (not shown) including the following fields:
Length::=int (Length of the data)
Key Alias::=String (The Key Alias sent in the request)
Public Key::=String (The base 64 encoded Public Key of the key retrieved using the key alias)

Once the signed data is returned to the client 210, the client may distribute the signed data as required, e.g. to the DNS or other service, and/or send confirmation messages as needed. In embodiments, the client 210 may be configured as a DNSSEC application that can identify and act on DNS changes and the like, as well as determine appropriate DNSSEC functions that need to be performed. Thus, the signing server 212 may be relieved of many of the DNSSEC-specific application programming and functionality. The DNSSEC application, e.g. the client 210, can focus on the DNSSEC business logic (what resource records need to be signed, etc.) without having to be concerned with the specifics of the signing parameters and without having to incur the processing and network costs of assembling and passing the extra information to the signing server 212. Likewise, as discussed above, the various request and response protocols allow the DNSSEC application to combine all of the relatively smaller signing requests (without all of the various DNSSEC signing parameters and key information) into a single packet, thus greatly reducing the network load and overhead. Finally, the client 210 can also be relieved of any of the HSM interface details.

Figure 9:
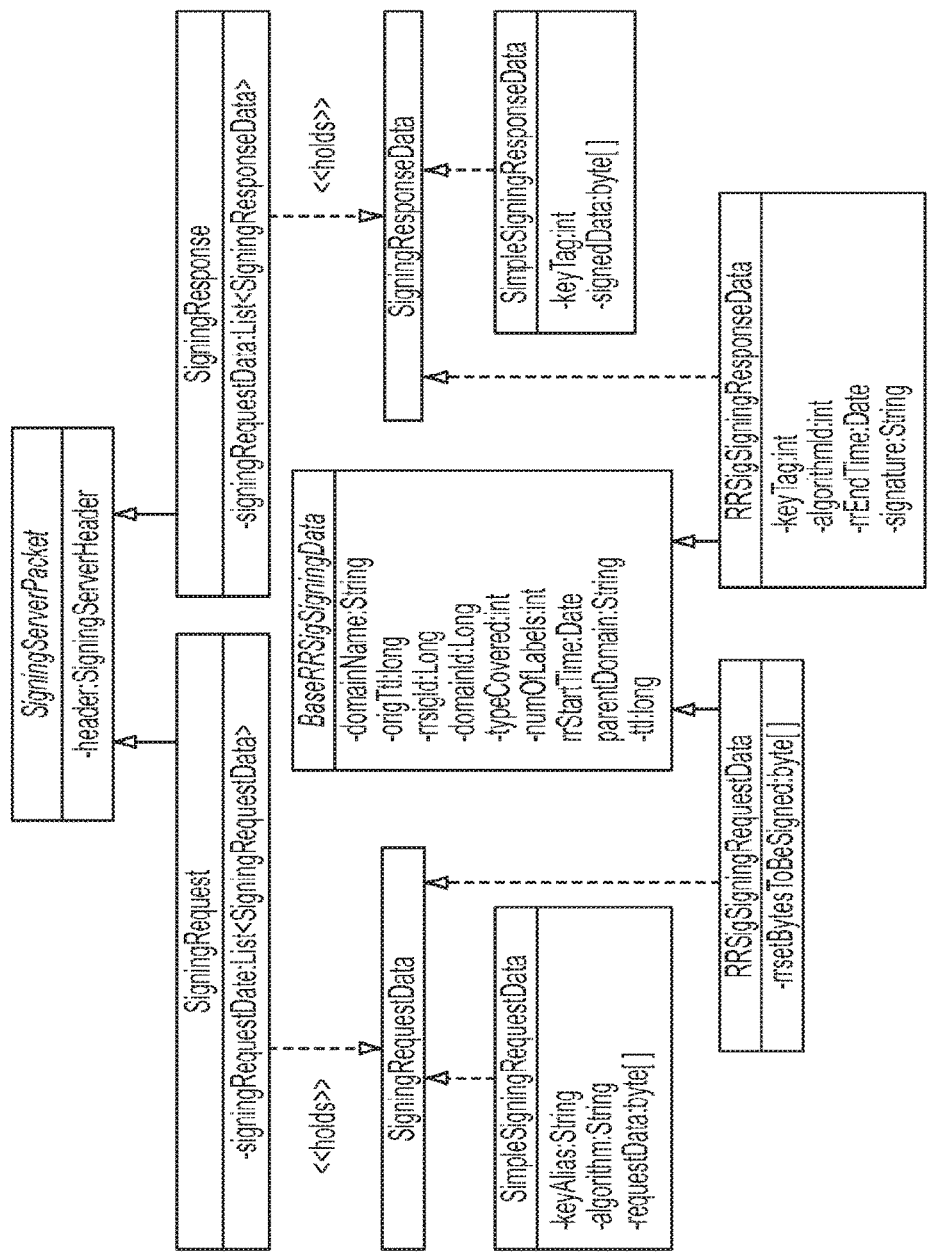
FIG. 9 depicts relationships of exemplary requests, request data, responses, and response data according to aspects of the invention.

FIG. 9 graphically depicts relationships of the above-described exemplary request and response protocols as shared between the client and server. It should be noted that the protocols described above, and the specific contents, are exemplary in nature and do not limit the scope of the invention to such specific protocols. For example, other protocols may be implemented that capitalize on the capabilities of the intelligent signing server, e.g. where the key schedule is loaded into the signing server and the client just has to pass the data to sign along with appropriate identifiers for the signing server to automatically choose the right key.

Figure 10:
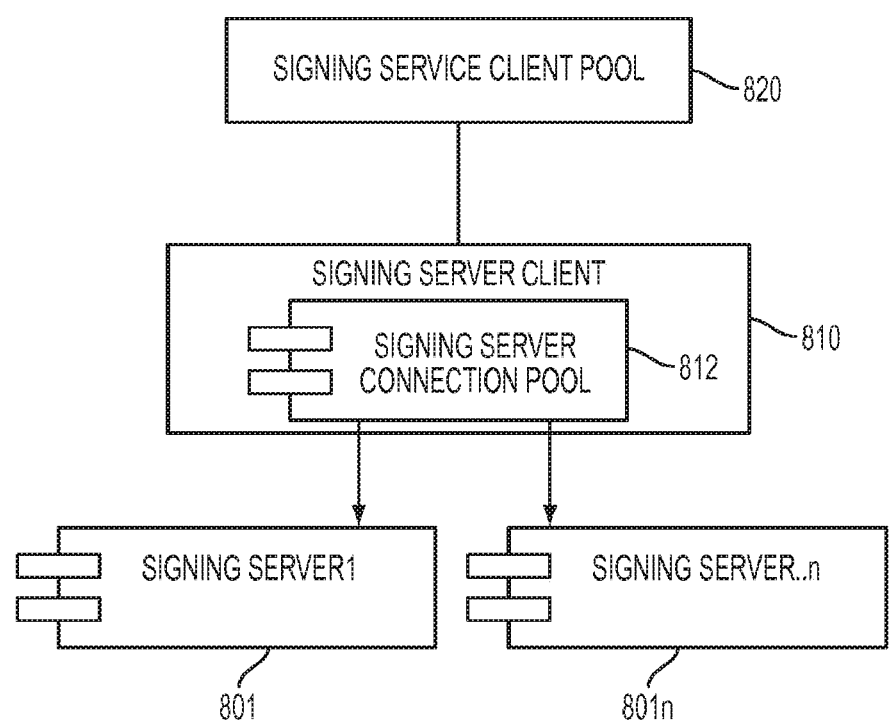
FIG. 10 depicts further details of an exemplary DNSSEC-enabled signing system, including a signing service client pool manager, according to aspects of the invention.

According to further aspects of the invention, clusters of clients and signing servers may be managed to improve the load balancing and responsiveness of signing systems as described herein. For example, as shown in FIG. 10, in embodiments, for each signing server 801-801n, there may be one instance of a SigningServerClient 810 to handle requests for the particular signing server. Over the SigningServerClient 810, there may also be a SigningServiceClientPool 820 that manages SigningServerClient instances. The SigningServiceClientPool 820 may be connected to any number of SigningServerClients, and may be configured to, for example, load balance requests to various signing servers e.g. in round robin fashion, take a SigningServerClient instance out of rotation if the signing server it is connected to is down, etc.

Each SigningServerClient 810 may be configured to maintain the pool of socket connections 812 with the signing servers, notify SigningServiceClientPool 820 if this service goes down and start health check thread, and/or continuously try to connect the signing server and notify SigningServiceClientPool 820 to put this service back in the rotation after the signing server comes back up.

Accordingly, the overall system may adjust to client-side and server-side failures. For example, the client-side service may maintain a list of signing servers and will react to identified "fatal" exceptions/error responses from those servers. The client-side may remove those faulty signing servers from the round-robin rotations and may continually attempt to recognize when the server comes back online. The signing server may be configured to support a "ping" so that clients can check its health.

If the client-side signing service finds that all of its signing servers are down, it may immediately return exceptions when it receives requests to have something signed. The client may continue to do this until at least one of the signing servers has become available.

Failure scenarios from the signing server-side may include the non-availability of one its dependencies, e.g. the HSM or the key database. If the HSM is unavailable, the signing server may report error responses indicating this. The signing server may alert on this condition via, for example, JMX and log entries. The signing server may also continually try to detect whether the HSM is back online. If the key database becomes unavailable for refreshes of key data, the signing server may be configured to refuse requests to sign data, e.g. because it runs the risk of signing with the wrong key. The signing server may be configured to report this error as signing responses, and may continually try to connect back to the key database.

Another option is to configure the signing server to "drop" the client connection and/or stop listening for new connections for a particular service when that service is not functioning properly. Such configurations may be beneficial, for example, in allowing the client to direct service requests only to signing servers that are currently operable to perform the service, improving monitoring of the state of the signing service network, reducing the number of errors reported back to the client, and improving the overall efficiency of the client. Such configurations may also allow the signing server to continue with other operable services without the burden of encountering and/or reporting errors for the non-functioning service until the issue is resolved. Similar configurations may be applied between the signing server and a plurality of supporting HSMs or other signature modules.

According to the arrangements depicted in FIGS. 1, 2 and 10, and aspects of the Request and Response protocols detailed above, clients, such as client 210, may employ techniques and client-utility libraries to provide load-balancing and high-availability features. For example, client-utility libraries may interact with the signing server regardless of which service module inside of the server they are using. The client-utility libraries may provide auto-reconnect and fast-fail (in times of service unavailability) as part of their feature sets. The load-balancing features of the client-utility libraries may also help ensure that no matter how many signing servers are available and not-available, and no matter how many clients are connected to these servers at any time, the load will be relatively evenly distributed among the active servers automatically.

In embodiments, service module plugs for the signing server may include modules for one or more TLDs, e.g., .com, .net, .edu, etc. In embodiments, multiple TLDs may be supported by a single service module that is aware of the various key schedules and/or protocols for the different TLDs. Service modules may be configured to provide, for example, which ZSK is to be used for generating a digital signature on demand, given the TLD for which the signature applies and accounting for key rollovers; which hardware or software signer should be generating the signature for that TLD; which TLD-specific parameters to use when generating the signature, including salt, hashing algorithm, signing algorithm, signature duration, etc. In embodiments, the signing server may be configured to automatically and periodically re-load these settings from the database so that it can pick up changes during normal operation without a re-start.

A particular advantage to this approach is that there may be provided a centralized, authoritative configuration that ensures consistent signature production per TLD. Further, it means that the registry applications for the TLDs themselves may not have to know of these policies directly, but rather, request the signing server to sign data and rely on the signing server to apply the requisite policies and parameters when doing so, on a per-TLD basis. This methodology may reduce the risk of the registry as a whole becoming out of date in terms of signing-configuration data when those data change during normal operation because, for example, there may be far fewer signing servers than there are registry-application instances. Additionally, the clients to the signing servers do not need to have additional configuration and application logic related to loading TLD-specific signing parameters, which would increase application complexity and increase the risk of misconfigurations, resulting in digital-signature failures. Finally, the clients do not have to pass along to the signing server the TLD-specific signing parameters with each request, which means reduced network load and greater throughput.

More generally speaking, according to aspects of the invention, signing servers may be configured to allow for developers to plug in "smart" services, where the services hold the knowledge about which keys are active, which algorithms are to be used, and so on, based on the context of the signing request, which itself may contain none of this information. This may be preferable particularly in contexts where the clients are meant to remain as "dumb" as possible. This can be used to, for example, implement smaller packets, reduce the chances of clients operating with outdated information or not being synchronized with the state of the keys, and provide less voluminous and brittle client code.

Figure 11:
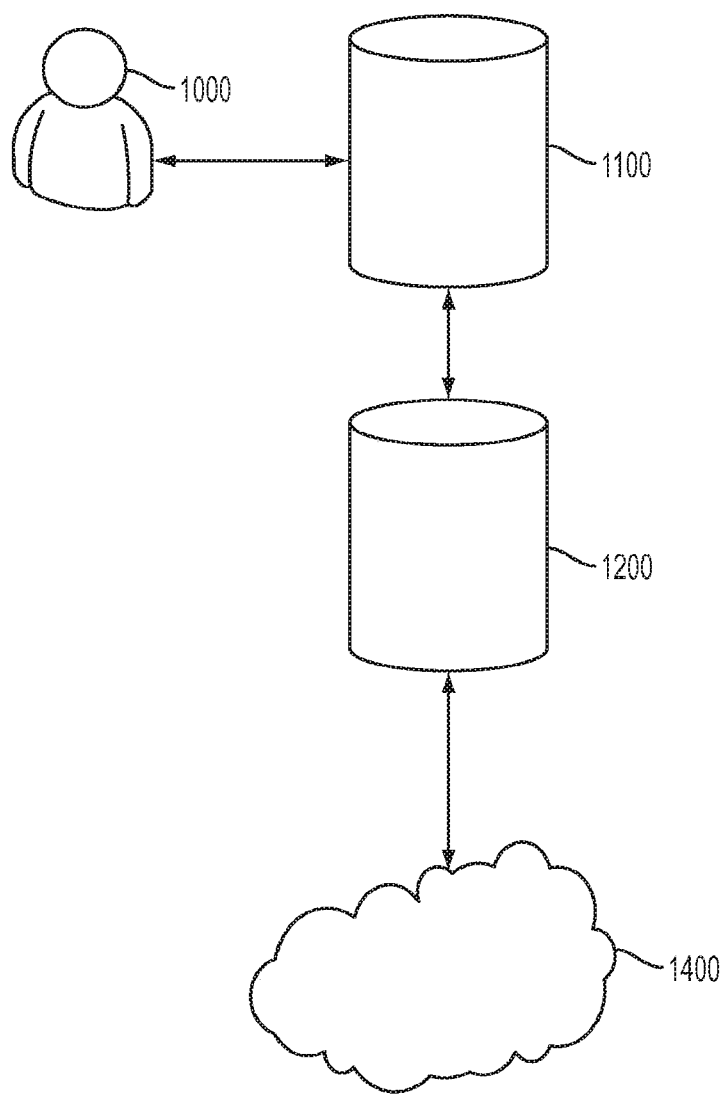
FIG. 11 depicts a schematic system arrangement for an exemplary inline signing technique for DNSSEC signing that may be supported according to aspects of the invention.

As previously mentioned, signing server methodology and apparatus as described herein may find applicability, and be compatible with, a vast array of DNS, and other signature, services. For example, by providing a network-accessible, configurable, signing server, various remote signing protocols and configurations may be readily supported. One such non-limiting example which may be supported includes an "inline signing" arrangement, which may be used for DNSSEC signing functions described herein, details of which are shown in FIG. 11. As shown in FIG. 11, a requester 1000, such as, for example, a registrant, a registrar or a DNS provider, may communicate with a registry provisioning system 1100. The requester 1000 may communicate commands related to an existing or new domain. For example, requester 1000 may communicate commands to change DNS data managed by the registry, such as DNS data for a domain under a TLD (e.g., .com) managed by the registry. Registry provisioning system 1100 may process the domain command from the requester 1000 in various ways including, for example, executing change commands, e.g. add, modify, or delete commands, identifying DNSSEC data changes, identifying appropriate keys, applying digital signatures, persisting DNS and DNSSEC changes to a registry database 1200, etc.

Data provided by the registry provisioning system 1100 to the registry database 1200 may include DNS information for the domain and signed DNSSEC data. In embodiments, exemplary signing servers may support, for example, a method of implementing the DNS changes and the DNSSEC changes within a single transaction.

As described above, the DNSSEC signing may be done by the signing server, synchronously inline with the transaction. Separate services may be used to take each committed transaction in the Registry database and apply it incrementally to the DNS Servers.

DNSSEC signing inline with the domain commands of a domain registry may provide advantages in maintaining a highest level of data integrity by ensuring, for example, that the registry database always represents the authoritative source for what is published in DINS.

As part of implementing the DNSSEC inline signing, a cluster of network available and high-performance signing servers, such as shown in FIGS. 1 and 2, may be provided to sign the DNSSEC information. This has been found to be effective even in the context of the largest TLDs, and maintains the domain registry response time SLA's, as well as maintaining the DNS propagation SLA's with a high level of data integrity, even when serving 1,000+ simultaneous connections from clients who need digital signatures.

Figure 12:
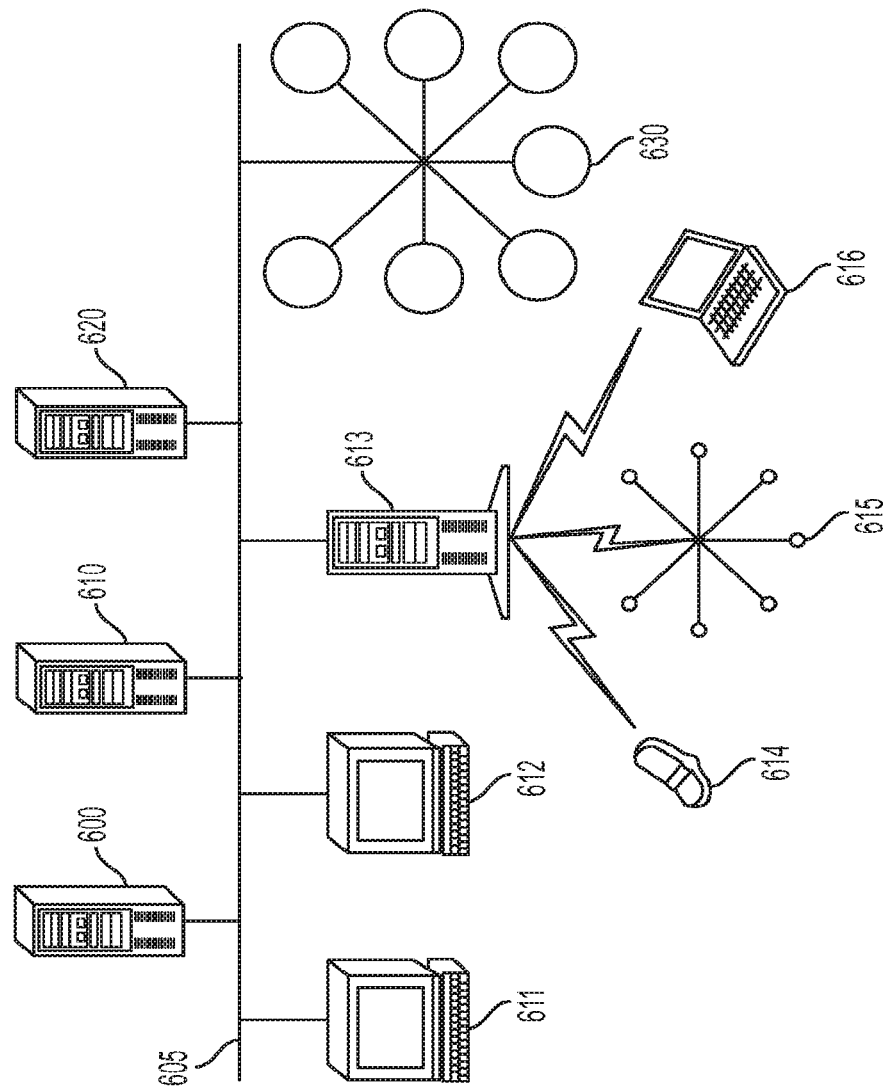
FIG. 12 depicts an exemplary computer network architecture as may be used in embodiments of the invention.

Embodiments of the present invention can include systems for implementing the described methods, as well as computer-readable storage medium coded with instructions for causing a computer to execute the described methods. For example, as shown in FIG. 12, server systems such as servers 600, 610, and/or 620, including at least a processor, a memory and an electronic communication device (not shown), may be configured to receive, identify, respond to and/or act on a request, such as those described herein, received over the network 605, such as the Internet. Any of servers 600, 610, and/or 620 may be operated by, for example, an Internet hosting provider, a registrar, and/or a registry as described further herein, and may be in communication with any number of recursive DNS servers generally represented by web devices 630. As described herein, recursive servers 630 may cache DNS-related data for domains of the hosting providers, registrars, and/or registries operating servers 600, 610 and 620.

Requests to update DNS data for a domain may originate from, for example, a registrar, DNS service provider, or registrant, via various systems such as, for example, computers 611, 612, via separate server 613 which may be in wireless or other communication with mobile device(s) 614, picocell network devices 615, mobile computer 616, or any other network-capable device with the requisite functional capabilities.

The various communications, transmissions, and related functions described herein may be accomplished, for example, via the network 605, and the results of the described processing performed by server systems such as servers 600, 610 and 620, may be displayed, stored and/or distributed according to known techniques. The network 605 may include any number of communication components including wired, cellular, satellite, optical and/or other similar communication links.

The servers 600, 610 and 620, and computers 611, 612, may include any number of processors (not shown) that are coupled to storage devices including a first storage (not shown, typically a random access memory, or "RAM"), second storage (not shown, typically a read only memory, or "ROM"). Both of these storage devices may include any suitable type of computer-readable media, including non-transitory storage media such as flash drives, hard disks, floppy disks, magnetic tape, optical media such as CD-ROM disks, and/or magneto-optical. A mass storage device (not shown) may also be used to store programs, data and the like and is typically a secondary storage medium, such as a hard disk that is slower than primary storage. It will be appreciated that the information retained within the mass storage device, may, in appropriate cases, be incorporated in standard manner as part of primary storage as virtual memory. A specific mass storage device such as a CD-ROM may also pass data uni-directionally to the processor.

The servers 600, 610 and 620, and computers 611, 612, may also include an interface that includes one or more input/output devices such as such as video monitors, track balls, mice, keyboards, microphones, touch-sensitive displays, transducer card readers, magnetic or paper tape readers, tablets, styluses, voice or handwriting recognizers, or other known input devices, including other computers. The servers 600, 610 and 620, and computers 611, 612, may be coupled to a computer or other electronic communication network 605 using a network connection. The network 605 can connect various wired, optical, electronic and other known networks to exchange information among servers 600, 610 and 620, computers 611, 612, separate server 613, mobile device(s) 614, picocell network devices 615, mobile computer(s) 616, recursive servers 630, and any other devices with similar functionality. With such a network connection, it is contemplated that the servers 600, 610 and 620, and computers 611, 612 and the processors therein may receive information from the network 605, or may output information to the network 605 in the course of performing the above-described method steps. The above-described devices and materials will be familiar to those of skill in the computer hardware and software arts and need not be individually or exhaustively depicted to be understood by those of skill in the art. The hardware elements described above may be configured (usually temporarily) to act as one or more modules for performing the operations described above.

In addition, embodiments of the present invention further include computer-readable storage media that include program instructions for performing various computer-implemented operations as described herein. The media may also include, alone or in combination with the program instructions, data files, data structures, tables, and the like. The media and program instructions may be those specially designed and constructed for the purposes of the present subject matter, or they may be of the kind available to those having skill in the computer software arts. Examples of computer-readable storage media include magnetic media such as flash drives, hard disks, floppy disks, and magnetic tape; optical media such as CD-ROM disks; magneto-optical media; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

The description given above is merely illustrative and is not meant to be an exhaustive list of all possible embodiments, applications or modifications of the invention. Thus, various modifications and variations of the described methods and systems of the invention will be apparent to those skilled in the art without departing from the scope and spirit of the invention. Although the invention has been described in connection with specific embodiments, it should be understood that the invention as claimed should not be unduly limited to such specific embodiments.

What is claimed is:

1. A remote Domain Name System Security Extensions (DNSSEC) signing system comprising:
   a registry provisioning computer system configured to accept and execute a command that changes Domain Name System (DNS) data related to a domain;
   a registry database storage device storing DNS data; and
   a signing server configured to interact with the registry provisioning computer system and registry database to sign DNS data;
   wherein the signing server is configured to:
   receive a signing request from the registry provisioning computer system to sign a first data;
   determine an active Key Signing Key (KSK) or an active Zone Signing Key (ZSK) to sign the first data;
   transmit the first data to one of a plurality of digital signature logic to be signed;
   receive the first data that has been signed using the active KSK or the active ZSK; and
   store the first data that has been signed in the registry database storage device.

2. The remote DNSSEC signing system of claim 1, wherein the registry provisioning computer system supports a provisioning interface.

3. The remote DNSSEC signing system of claim 2, wherein the command changes DNS data for a domain under a Top level Domain (TLD) managed by a DNS registry.

4. The remote DNSSEC signing system of claim 3, wherein the remote DNSSEC signing system is further configured to sign one or more portions of the DNS data that has been changed by the command according to a DNSSEC protocol, without signing an entire zone.

5. The remote DNSSEC signing system of claim 4, wherein the remote DNSSEC signing system is further configured to take each committed transaction in the registry database and apply it incrementally to a plurality of DNS Servers.

6. The remote DNSSEC signing system of claim 4, wherein the signing server is configured to provide signed DNS data to the registry provisioning computer system.

7. The remote DNSSEC signing system of claim 3, wherein the remote DNSSEC signing system is further configured to sign an entire zone.

8. The remote DNSSEC signing system of claim 3, wherein the remote DNSSEC signing system is further configured to apply a DNS data change to a plurality of DNS Servers.

9. The remote DNSSEC signing system of claim 2, wherein the command adds a new domain.

10. The remote DNSSEC signing system of claim 9, wherein the remote DNSSEC signing system is further configured to update NextSECure (NSEC) resource records.

11. The remote DNSSEC signing system of claim 9, wherein the remote DNSSEC signing system is further configured to update NextSECure version 3 (NSEC3) resource records.

12. The remote DNSSEC signing system of claim 2, wherein the command updates an existing domain.

13. The remote DNSSEC signing system of claim 2, wherein the remote DNSSEC signing system is configured to process requests regarding domains under different top-level domains (TLDs).

14. The remote DNSSEC signing system of claim 2, wherein the remote DNSSEC signing system is configured to process requests regarding at least two domains managed by a plurality of registrars.

15. The remote DNSSEC signing system of claim 2, wherein the signing request specifies an algorithm to use to sign the first data.

\* \* \* \* \*